March 26, 1946.  E. D. MacEWING  2,397,281
HOMOGENIZING MACHINE
Filed June 4, 1945  2 Sheets-Sheet 1

Inventor
Eugene D. MacEwing
By Liverance and
Van Antwerp
Attorneys

March 26, 1946.                E. D. MacEWING                    2,397,281
                             HOMOGENIZING MACHINE
                              Filed June 4, 1945                2 Sheets—Sheet 2

Inventor
Eugene D. MacEwing
By Liverance and
Van Antwerp
Attorneys

Patented Mar. 26, 1946

2,397,281

UNITED STATES PATENT OFFICE 2,397,281

HOMOGENIZING MACHINE

Eugene D. MacEwing, Grand Haven, Mich., assignor to Dake Engine Co., Grand Haven, Mich., a corporation of Michigan Application June 4, 1945, Serial No. 497,545

9 Claims. (Cl. 259—47)

The present invention is directed to the production of a novel, readily and easily assembled and disassembled homogenizing machine, and a novel valve or element through which milk for example is forced under pressure to break up the fat globules therein and cause the fat to remain in suspension so that it will not separate and rise because of its lower specific gravity and equally useful for emulsifying other fatty material, and materials more or less heterogeneous.

The machine of novel character which I have perfected with that part of machine coming in contact with the material is very easily and readily maintained in sanitary condition being quickly and easily disassembled for cleaning and thereafter reassembled for the succeeding run of the material to be homogenized, it being an accepted practice that after each run of a homogenizing machine the parts thereof must be thoroughly cleaned for sanitation purposes.

Further with my machine, very high pressures ranging up to five thousand pounds per square inch or higher as necessary may be obtained in order to properly effect the homogenization. At the same time a novel construction is provided for the installation and removal of the homogenizing element in the flow line of the material which is being processed, such removal occurring at the end of a run with replacement of a new element or disc or sanitary cleaning thereof prior to the beginning of a succeeding run of the material.

It is among the objects and purposes of the present invention to produce a machine having the desirable functions stated as well as many others which will hereinafter appear.

A further object of the invention is to produce a novel and effective homogenizer made of pellets of solid material of uniform size which in preferred form are bonded together thereby obtaining a multitude of tortuous passages of substantially uniform size through the homogenizer element for the passage of the material therethrough with a uniform porosity of the element following by reason of the uniform pellet size of the materials used. A single element having two or more transversely located zones each zone of which will be made up of pellets of uniform size preferably bonded together, but with the sizes of the pellet varying in the zones; or separated elements, each differing from the other in the sizes of the pellets may be used. With such novel homogenizer element used, one or more of them, providing a large number of tortuous paths or uniform orifices presenting a multitude of impinging uniform surfaces to the flow of material through the element and with a large number of high velocity streams colliding with each other in passing through the element, there is obtained exceptionally satisfactory and effective homogenization. Other results and functions will appear upon an understanding of the invention had from the following description taken in connection with the accompanying drawings, in which, Fig. 1 is a partial elevation and vertical section through the homogenizing machine of my invention.

Like reference characters refer to like parts in the different figures of the drawings.

Figure 1:
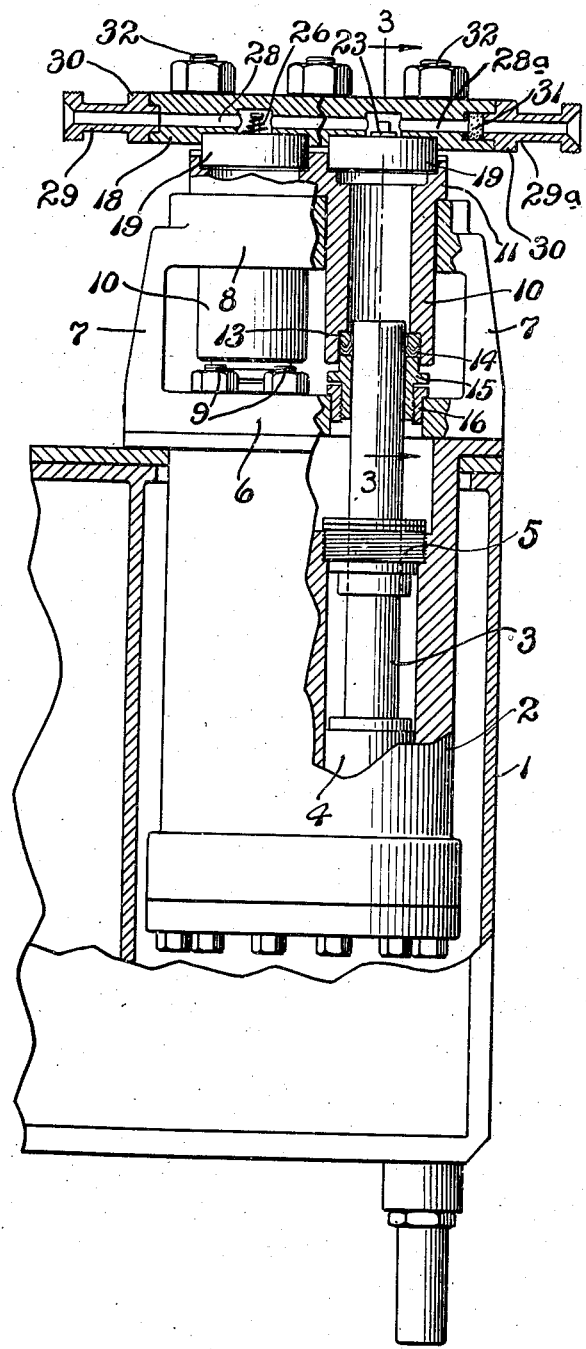

In the structure disclosed (Fig. 1), a suitable support 1 is provided within which a cylindrical container 2 is vertically disposed at its upper end having an annular flange bearing upon the upper side of the support 1 and within which two cylinder structures 4, preferably hydraulically operated, are disposed each for the purpose of operating a solid piston 3 in a vertical direction. The piston passes through and is guided by a surrounding exteriorly threaded ring 5 secured in place as shown in Fig. 1. With the machine of my invention there will be two of the solid pistons 3, mounted in the containers 2 and in practice one of pistons 3 will be moving upwardly with the simultaneous downward movement of the other for the purpose of reducing or eliminating pulsations of flow of the liquid which is being processed. It is to be understood that the manner of reciprocating the pistons 3 is not an essential part of the present invention and the detail thereof is not shown or described.

At the upper side or top of the support 1 a heavy casting is located, having a base 6 and upwardly extending ends 7 spaced from each other connected at their upper ends by a horizontal top member 8. Said casting is located over the piston containing member 2 resting upon the upper flanges thereof and is bolted in place by bolts 9. Through the upper portion 8 two vertical cylinders 10 extend downwardly, at their upper ends enlarged as indicated at 11, to provide under shoulder portions to rest upon said top 8. Each cylinder at its upper end is interiorly enlarged in bore as indicated at 12. The lower end of each cylinder is likewise interiorly bored and enlarged to receive a ring 13 which at its lower edge portion is substantially triangular in cross section. The pistons 3 pass through their associated rings 13 into an associated cylinder 10. At the lower side of each ring 3 packing materials 14 substantially V-shape in cross section are located, being disposed between the rings 13 and sleeves 15 outwardly flanged between their ends and exteriorly screw threaded at their lower portions to thread into interiorly threaded collars 16 (Fig. 3) which extend downwardly into openings through the base 6. The collars 16 are enlarged at their upper ends to provide annular shoulders resting upon the upper side of the base 6, and between the upper ends of the collars 16 and the lower sides of the flanges projecting from the sleeves 15, suitable spacing disks 17 are located, it being apparent that by adjusting any sleeve 15 in its associated collar 16 the packings at 14 may be subjected to a desired pressure.

A head 18 is located over the upper ends of the cylinders 10, and is cast as a single casting, at its under side being suitably recessed to receive the upper portions of cylindrical valve carrying members 19, the lower portions of which enter into the upper ends of the cylinders 10, with packing rings 20, two of them, between the upper side of each member 19 and the lower side of the head 18 and a flat packing ring 21 between each member 19 and cylinder 10 with which associated. From each member 19 a short pin 22 extends laterally for proper location with reference to a notch receiving said pin, as shown in dotted lines in Fig. 3.

Figure 2:
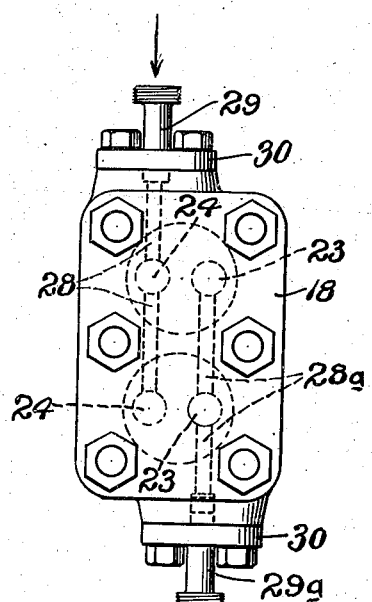
Fig. 2 is a plan view of the head of the homogenizer.
Figures 3, 4, 5, 6:
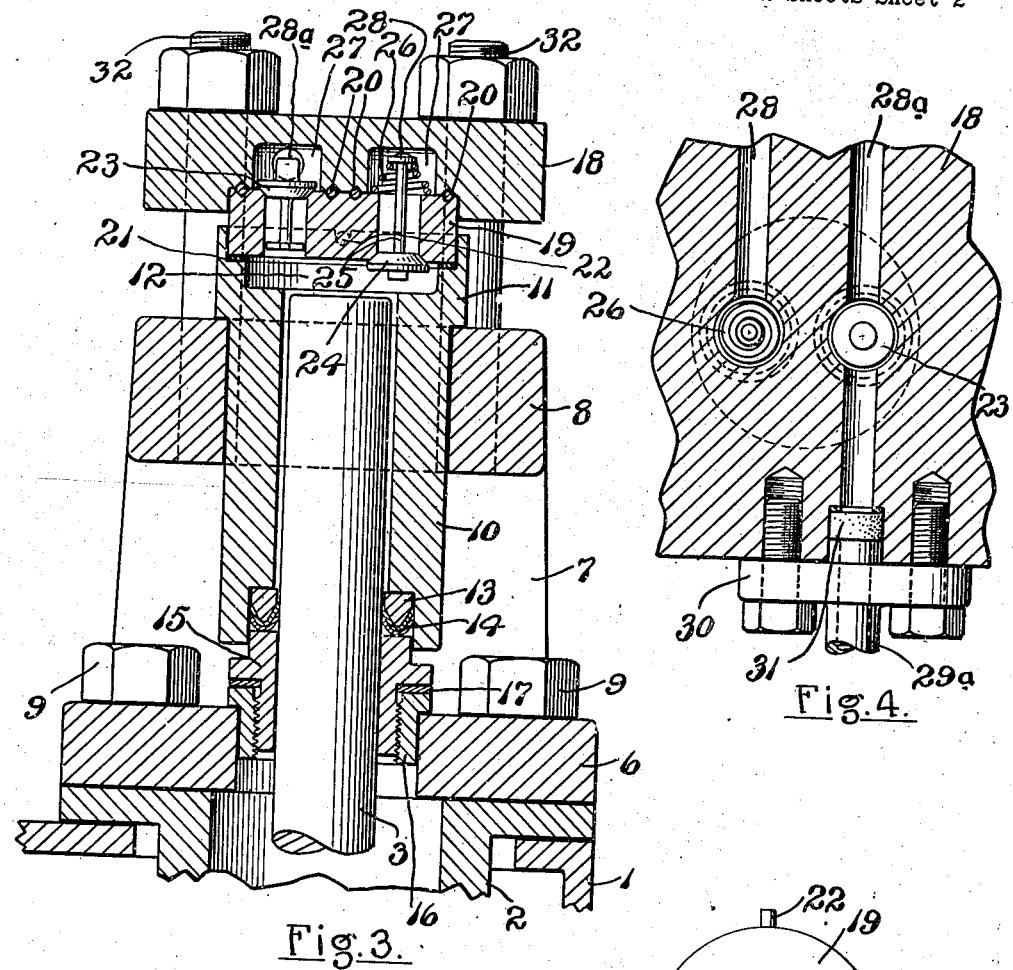
Fig. 3 is a fragmentary vertical section substantially on the plane of line 3—3 of Fig. 1, looking in the direction indicated by the arrows.
Fig. 4 is a fragmentary horizontal section through the upper head of the machine at the delivery end.
Fig. 5 is a plan view of the circular head disks disposed underneath the upper head of the machine, one being located at the upper end of each cylinder.
Fig. 6 is a perspective view of a homogenizing disk or element.

Each of the cylindrical valve carrying members 19 has two vertical openings therethrough spaced from each other around each of which a packing ring 20 is located. A valve 23 is disposed in position to close the upper end of one of said openings and a second valve 24, to close the lower end of the other of said openings. The first valve 23 has a valve stem extending into its associated opening to guide the valve and the second valve 24 has a stem 25 extending through its associated opening and is surrounded at its upper portion by a coiled spring 26 to normally hold valve 24 in an upper closing position against gravity. The head 18 at its under side, where said valves 23 and spring 26 are located, is upwardly recessed to provide recess 27 as shown in Fig. 3. The head 18 toward one side has a horizontal passage 28 therethrough from one end of the head toward but short of the other end thereof. Said head also has a second horizontal passage 28a which reaches from the other end of the head toward but short of the opposite end (Fig. 2). Both passages 28 and 28a at their outer ends are provided, the first with an inlet member 29 having flanges 30 for detachable connection to the head and the second with a similar outlet member 29a with like flanges 30 for detachable connection to the opposite end of the head. There is an inlet passage longitudinally through the member 29 which is in conjunction with the outer end of passage 28, while the outlet member 29a has an outlet passage therethrough between the inner end of which and the outer end of the passage 28a the homogenizing element 31 of my invention is held in a cylindrical recess provided therefor (Fig. 1). Bolts 32 connect the head 18 to the top 8 by use of nuts, the head being readily removable on removal of the nuts.

The passage at 28 leads to the recess at 27 in which the springs 26 associated with valves 24 are located. The passage 28a connects the recess 27 to which the valves 23 partly extend. The inlet member 29 having suitable connection with the source of the liquid, such as milk for example, which is to be homogenized, on the downstroke of the solid piston 3 the material drawn through the passage 28 and into a cylinder 10, valve 24 being pulled down against the lifting force of its associated spring 26 thereby filling such cylinder 10 above piston 3. On the succeeding upstroke of the piston valve 24 is forced tightly into closed position and valve 23 lifted, the material passing through passage 28 and through the homogenizer disk member 31 and outward through the outlet 29. The description applies to both pistons 3 which are used, one of which on a downstroke draws material into its associated cylinder, while simultaneously the other piston 3 is on its upstroke forcing the material out of the cylinder 10 with which associated, thus providing a continuous flow of the material under a substantially uniform pressure.

The homogenizing element 31 is made of pellets of various uniform sizes preferably bonded together to provide a disk which retains its shape but is porous, that is, it has a plurality of uniform tortuous passages through it. In practice the disk is made preferably from pellets of small size, the size being uniform by screening out all above and below the selected size and then bonded together by a suitable means, as an example the pellets may be of copper and a small proportion of tin may be used as the bonding material, bonded under heat and pressure.

For different conditions, for example, with a different viscosity of the liquid material being homogenized, the size of the pellets in the disk may be varied. It is of course to be understood that copper pellets bonded together by tin does not limit the invention to the use of such materials alone, as numerous other small pellets of other materials, such as ceramic pellets with suitable bonding material are contemplated. In practice with such disk the uniform porosity of the disk controlled by the uniform pellet size is productive of uniformity of result with products of the same viscosity under the same pressures. As previously mentioned similar rates of flow for products of different viscosities may be maintained by use of disks having different sizes of pellets. It is also possible and it is contemplated in my invention to use more than one disk between the pressure and outlet sides of the machine, said disks being placed end to end and when thus used there is in effect a multiple homogenization. The pellets of a disk while uniform in size will vary in size from those of the other disks. With this structure of homogenizing element having substantially uniform tortuous passages therethrough, there is produced a constant internal resistance to the passage of liquids of the same viscosity and the rate of flow of the liquid through the disk will vary directly in proportion to the pressure, permitting an output volume adjustment within the range of pressures which produce homogenization.

It is apparent that the mechanism described is one which is quickly and easily disassembled and reassembled. For example by removing the nuts from the bolts 32, the head 18 may be lifted after which the valve carrying members 19 may be removed and then the cylinders 10, the rings 13 and packings 14, the sleeves 15 and collars 16. The inlet member 29 and outlet member 29a are readily removed by removing the screws securing them to the ends of the head 18. Each of the parts then may be cleaned or sterilized to place the machine in a completely sanitary condition. Such care in maintaining homogenizing machines in sanitary condition is a requirement of the law in many localities and with the present machine it is very quickly and effectively accomplished. It is also apparent that the parts may easily be reassembled. One feature of utility in conjunction with the reassembly is the vertical positioning of the piston and cylinders and the valve carrying members, so that there is small chance of parts being dropped or misplaced, the parts in succession being assembled from above one over the other, where they are retained by gravity. Such facicity of disassembly and reassembly greatly adds to the practical value of the machine.

The invention is defined in the appended claims and is to be considered comprehensive of all forms of construction, or variations thereof from the specific disclosure made, which are comprehended by the claims. The invention has proven particularly practical and useful in extensive tests and trail under the conditions at which the homogenizing of milk must take place. Satisfactory homogenization occurs under much lower pressure than has been heretofore necessary. It is to be further understood that with the present invention homogenizing of other materials which normally separated upon standing may be performed as in the production of many and various kinds of emulsions; and while the device was primarily devised for the homogenizing of milk, other uses are contemplated and the invention is not to be restricted in use to any single place or type of utility.

I claim:

1. In a structure as described, two vertically positioned cylinders, a vertical piston mounted in each and extending above said cylinders, a support having a base, spaced apart ends and a connecting top between said ends located over said cylinders, said base and top having openings alined with the piston and a guide collar for each piston extending into the base openings from above said base, other cylinders extending through the openings into the lower ends of which said pistons pass, packing means between the lower ends of said other cylinders and said pistons, valve carrying members located one at the upper end of each of said other cylinders, each having an inlet and outlet passage and valves for controlling entrance of liquid into a cylinder and its forcing out thereof on reciprocations of said pistons, and a head having inlet and outlet passages detachably connected to said support and bearing against said valve carrying members to clamp them in place, said head having inlet and outlet passages extending into the head from opposite sides thereof and spaced from each other, the inlet passage being associated with valve passages in said valve controlling intake carrying members to said cylinders and the outlet passage with those controlling the outflow of liquid from said second other cylinders.

2. The elements in combination defined in claim 1, said outlet passage adjacent its outer end having transversely across it a homogenizing disk having tortuous passages therethrough of substantially the same cross sectional area.

3. In a structure of the class described, a vertical reciprocable piston, a cylinder therefor, said piston extending upwardly above the cylinder, a support located over the cylinder, having a base, spaced ends and a horizontal top, a second cylinder extending freely through said top into which the upper portion of the piston extends, a packing ring in the lower end of said second mentioned cylinder through which the piston passes, a sleeve surrounding said piston below said packing, a collar into which said sleeve is inserted, said collar being freely received in an opening in the bottom of said support through which the piston passes, a valve carrying member located at the upper end of the piston having two vertical passages therethrough, inlet and outlet valves associated respectively with said passages, and a head having horizontal inlet and outlet passages disposed over and against said valve carrying member, the inlet passage connecting with the passage in the valve carrying member with which the inlet valve is associated, and the outlet passage connecting with the passage through the valve carrying member with which the outlet valve is associated, and means for detachably clamping said head against the valve carrying member and clamp said valve carrying member against the cylinder to force said cylinder against the upper side of the top of said support, whereby on removing said head the valve carrying member, cylinder, packings, sleeve and collar may be removed in succession.

4. In a structure of the class described, a support having a base and a top spaced from the base and carried thereby said top and said base each having two spaced openings therethrough, a cylinder extending downwardly freely through each of said openings in the top of the support and terminating short of said base, a collar located at the lower end of each cylinder located by and extending partly into an associated opening in the base of the support, packing between the upper ends of said collars and the lower end portions of the cylinders, a piston extending through each collar and reciprocable in each cylinder, inlet and outlet valves mounted at the upper end of said cylinder, a head located over both cylinders and over the valves therein, said head having two spaced horizontal passages, one from each end extending inwardly toward but short of the other end of the head, said inlet and outlet passages respectively connecting with the inlet and outlet valves whereby liquid may be drawn into the cylinders on downstroke of the pistons and expelled therefrom on the upstroke thereof.

5. A construction as described in claim 4, said outlet passage near its outer end having transversely thereacross a homogenizing body provided with minute passages therethrough through which the liquid may be forced under pressure.

6. In a construction as described, a support having spaced apart sides with two series of alined openings therethrough two cylinders passing through the openings in the outer side and extending toward but short of the openings in the inner side of said support, pistons passing through the openings in the inner side of the support and into said cylinders, packing means carried by said cylinders at their ends adjacent the inner side of the support through which said pistons pass, sleeves through which said pistons pass extending into the openings in the inner side of the support, said cylinders and sleeves being freely removable, valve carrying members each having two passages therethrough with which are associated inlet and outlet valves, said valve carrying members being located at the outer ends of said cylinders, a head having two cored passages between its opposite sides, one extending from one end of the head toward but short of the other end and the other extending toward but short of the first mentioned end of the head, one of said passages being connected with the inlet passages in said valve carrying members, and means for bolting said head to said support against said valve carrying members to clamp said valve carrying members against the outer end portions of said cylinders, whereby said head may be removed on unbolting the same from the support thereby freeing the valve carrying members, cylinders, packing and collars for ready removal.

7. In a construction as described, a cylinder, a piston entered at one end into said cylinder and reciprocable therein, said cylinder at the opposite end being interiorly enlarged, a disk shaped valve carrying member having two transverse passages therethrough seated partially in said enlargement of the cylinder bore, an inlet and an outlet valve mounted in said passages, a support through which the cylinder passes, said cylinder at its outer end being increased in exterior dimension so as to bear against the outer side of the support, and a head having inlet and outlet passages connected with the inlet and outlet valve passages of said disk valve carrying member releasably connected to said support and pressing against the valve carrying member, clamping it between the head and the cylinder and pressing the cylinder at its exterior enlarged end portion against the outer side of the support.

8. A pump for a homogenizing machine comprising a cylinder, a reciprocable piston extending thereinto at one end, a support for the cylinder, a collar through which the piston passes detachably mounted on the support, packing between said collar and cylinder at the end at which the piston enters, a readily separable valve carrying member partially inserted in the opposite end of the cylinder, said valve carrying member having two transverse passages therethrough, inlet and outlet valves mounted in said passages, and a head bolted to said support against the valve carrying member, said head having inlet and outlet passages connected with the inlet and outlet passages through said valve carrying member.

9. The elements of claim 8 in which said collar is longitudinally adjustable whereby the pressure on said packing may be varied.

EUGENE D. MacEWING.